(12) United States Patent
Saxena et al.

(10) Patent No.: US 12,207,243 B2
(45) Date of Patent: Jan. 21, 2025

(54) TECHNIQUES FOR SEPARATED BEAM DESIGN

(71) Applicant: QUALCOMM Incorporated, San Diego, CA (US)

(72) Inventors: Amodh Kant Saxena, San Diego, CA (US); Mihir Vijay Laghate, San Diego, CA (US); Raghu Narayan Challa, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 17/513,585

(22) Filed: Oct. 28, 2021

(65) Prior Publication Data

US 2022/0141813 A1    May 5, 2022

Related U.S. Application Data

(60) Provisional application No. 63/108,041, filed on Oct. 30, 2020.

(51) Int. Cl.
*H04W 72/04*    (2023.01)
*H04B 7/06*    (2006.01)
(Continued)

(52) U.S. Cl.
CPC ........ *H04W 72/046* (2013.01); *H04B 7/0617* (2013.01); *H04B 7/0695* (2013.01); *H04B 7/088* (2013.01)

(58) Field of Classification Search
CPC . H04W 72/046; H04W 72/51; H04W 52/146; H04W 52/343; H04B 7/0617; H04B 7/0695; H04B 7/063; H04B 7/088
See application file for complete search history.

(56) References Cited

U.S. PATENT DOCUMENTS 11,784,697 B1\* 10/2023 Zhu ...................... H04B 7/0608
375/262
2015/0094076 A1\* 4/2015 Inoue ................... H04W 52/343
455/561

(Continued)

OTHER PUBLICATIONS

International Search Report and Written Opinion—PCT/US2021/072115—ISA/EPO—Mar. 4, 2022 (207999WO).

(Continued)

*Primary Examiner* — Jungwon Chang
(74) *Attorney, Agent, or Firm* — Dalei Dong; Holland & Hart LLP

(57) ABSTRACT

Methods, systems, and devices for wireless communications are described. A user equipment (UE) may be configured to select a set of beams to generate energy in a first coverage region (e.g., an out-of-coverage (OOC) region) to reduce the effects of a distorted electric field. The UE may select the set of beams based on gain parameters associated with a set of antennas at the UE, where the gain parameters are determined for communications in a second coverage region (e.g., an in-coverage (INC) region). In some examples, the UE may use iterative techniques to select the beams. In some examples, the UE may select the set of beams based on calculations using a set of codebook beams associated with the second coverage region. In some examples, the UE may additionally select the set of beams for communications in the second coverage region.

30 Claims, 9 Drawing Sheets

(51) Int. Cl.
*H04W 72/044* (2023.01)
*H04B 7/08* (2006.01)

(56) References Cited

U.S. PATENT DOCUMENTS

| | | | | |
|---|---|---|---|---|
| 2017/0207843 | A1* | 7/2017 | Jung | H04W 74/006 |
| 2019/0182852 | A1* | 6/2019 | Zhu | H04W 72/51 |
| 2019/0253128 | A1* | 8/2019 | Moon | H04B 7/088 |
| 2020/0112347 | A1* | 4/2020 | Fukui | H04W 52/146 |
| 2020/0358498 | A1* | 11/2020 | Mo | H04B 7/0695 |
| 2020/0389800 | A1* | 12/2020 | Laghate | H04B 7/088 |
| 2021/0058131 | A1* | 2/2021 | Zhu | H04B 7/063 |

OTHER PUBLICATIONS

QUALCOMM: "Beam Management for NR", R1-1708586, 3GPP TSG RAN1 #89 Hangzhou, P.R. China, May 19, 2017, 9 Pages, XP051262554, Retrieved from the Internet: URL: http://www.3gpp.org/ftp/tsg_ran/WG1_RL1/TSGR1_89/Docs/ [Retrieved on May 6, 2017] p. 7, Table 7.

Tidd W., et al., "A Compact Beamspace DOA Estimation and Beamforming Communication Device", Aerospace Conference, 2011 IEEE, IEEE, Mar. 5, 2011 (Mar. 5, 2011), pp. 1-8, XP031937896, DOI: 10.1109/AERO.2011.5747311, ISBN: 978-1-4244-7350-2, p. 1, right-hand column p. 3, right-hand column—p. 4, left-hand column.

Yu C.H., et al., "Beam Space Selection for High Rank Millimeter Wave Communication", 2015 IEEE 81st Vehicular Technology Conference (VTC Spring), IEEE, May 11, 2015 (May 11, 2015), pp. 1-5, XP033167194, DOI: 10.1109/VTCSPRING.2015.7145715, [Retrieved on Jul. 1, 2015] p. 1, right-hand column—p. 3, left-hand column p. 3, right-hand column, paragraph section c.—p. 4 p. 5, right-hand column.

* cited by examiner

TECHNIQUES FOR SEPARATED BEAM DESIGN

CROSS REFERENCE

The present application for patent claims the benefit of U.S. Provisional Patent Application No. 63/108,041 by SAXENA et al., entitled "TECHNIQUES FOR SEPARATED BEAM DESIGN," filed Oct. 30, 2020, assigned to the assignee hereof, and expressly incorporated by reference herein.

FIELD OF TECHNOLOGY

The following relates to wireless communications, including techniques for separated beam design.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be configured to communicate with a base station using beamformed transmissions. However, for some use cases, existing beamforming techniques may be deficient or sub-optimal in some current configurations.

SUMMARY

The described techniques relate to improved methods, systems, devices, and apparatuses that support techniques for separated beam design. Generally, the described techniques provide for configuring a user equipment (UE) to select a set of beams to generate energy in a first coverage region (e.g., an out-of-coverage (OOC) region) to reduce the effects of a distorted electric field. The UE may select the set of beams based on gain parameters associated with a set of antennas at the UE, where the gain parameters are determined for communications in a second coverage region (e.g., an in-coverage (INC) region). In some examples, the UE may use iterative techniques to select the beams, which may correspond to a set of basis vectors for a beamspace of the first coverage region. In some examples, the UE may select the set of beams based on calculations using a set of codebook beams associated with the second coverage region. In some examples, the UE may additionally select the set of beams for communications in the second coverage region, such that the set of beams may correspond to a set of basis vectors for a beamspace of the first coverage region and the second coverage region.

A method for wireless communications at a user equipment (UE) is described. The method may include selecting a set of beams for first communications in a first coverage region based on a set of gain parameters associated with a set of antennas, the set of gain parameters associated with second communications in a second coverage region, identifying an energy generated by the selected set of beams in the first coverage region, and communicating with a device via the selected set of beams based on the generated energy.

An apparatus for wireless communications at a UE is described. The apparatus may include a processor, memory in electronic communication with the processor, and instructions stored in the memory. The instructions may be executable by the processor to cause the apparatus to select a set of beams for first communications in a first coverage region based on a set of gain parameters associated with a set of antennas, the set of gain parameters associated with second communications in a second coverage region, identify an energy generated by the selected set of beams in the first coverage region, and communicate with a device via the selected set of beams based on the generated energy.

Another apparatus for wireless communications at a UE is described. The apparatus may include means for selecting a set of beams for first communications in a first coverage region based on a set of gain parameters associated with a set of antennas, the set of gain parameters associated with second communications in a second coverage region, means for identifying an energy generated by the selected set of beams in the first coverage region, and means for communicating with a device via the selected set of beams based on the generated energy.

A non-transitory computer-readable medium storing code for wireless communications at a UE is described. The code may include instructions executable by a processor to select a set of beams for first communications in a first coverage region based on a set of gain parameters associated with a set of antennas, the set of gain parameters associated with second communications in a second coverage region, identify an energy generated by the selected set of beams in the first coverage region, and communicate with a device via the selected set of beams based on the generated energy.

In some examples of the method, apparatuses, and non-transitory computer-readable medium described herein, selecting the set of beams may include operations, features, means, or instructions for selecting the set of beams for the second communications in the second coverage region based on the set of gain parameters, where the energy may be further generated by the selected set of beams in the second coverage region.

In some examples of the method, apparatuses, and non-transitory computer-readable medium described herein, the selected set of beams may be associated with a set of basis vectors of a beamspace associated with the first coverage region and the second coverage region.

In some examples of the method, apparatuses, and non-transitory computer-readable medium described herein, the selected set of beams may be associated with a set of basis vectors of a beamspace that includes a null space of a subspace associated with a set of codebook beams, the set of codebook beams associated with the second communications in the second coverage region.

In some examples of the method, apparatuses, and non-transitory computer-readable medium described herein, selecting the set of beams may include operations, features, means, or instructions for selecting a first beam based on the set of gain parameters, updating a pool of beams to exclude the selected first beam, and performing a selection procedure to select additional beams based on the selected first beam, where the selection procedure includes one or more iterations.

In some examples of the method, apparatuses, and non-transitory computer-readable medium described herein, each iteration of the one or more iterations of the selection procedure may include operations, features, means, or instructions for selecting an additional beam based on the selected first beam, a prior iteration of the selection procedure, or both and updating the updated pool of beams to exclude the selected additional beam.

Some examples of the method, apparatuses, and non-transitory computer-readable medium described herein may further include operations, features, means, or instructions for determining a separation parameter associated with the selected set of beams, where the selected set of beams may be selected based on the determined separation parameter.

Some examples of the method, apparatuses, and non-transitory computer-readable medium described herein may further include operations, features, means, or instructions for determining the set of gain parameters based on performing a set of gain calculations using a normalized electric field for each antenna of the set of antennas.

In some examples of the method, apparatuses, and non-transitory computer-readable medium described herein, the selected set of beams may be selected based on a set of codebook beams associated with the second communications in the second coverage region.

In some examples of the method, apparatuses, and non-transitory computer-readable medium described herein, the first coverage region includes an out-of-coverage region and the second coverage region includes an in-coverage region.

DETAILED DESCRIPTION

Some wireless communication systems may include one or more user equipments (UEs) and one or more base stations, such as next-generation NodeBs or giga-NodeBs (either of which may be referred to as a gNB) that may support one or more multiple radio access technologies (RATs) including 4G systems such as Long Term Evolution (LTE) systems, fifth generation (5G) systems which may be referred to as New Radio (NR) systems, and Wi-Fi systems (e.g., wireless local area network (WLAN) systems).

Devices in a wireless communications system (e.g., an NR system) may communicate using beamforming techniques, which may also be referred to as spatial filtering, directional transmission, or directional reception. For example, a UE may communicate with a base station using beamformed transmissions in a millimeter wave (mmW) frequency spectrum. The UE or the base station may combine energy generated using a set of antennas such that signals propagating in a first orientation (which may be referred to as a first coverage region or an out-of-coverage (OOC) region) with respect to the set of antennas may experience destructive interference. Additionally, based on the combined energy, signals propagating in a second orientation (which may be referred to as a second coverage region or an in-coverage (INC) region) with respect to the set of antennas may experience constructive interference. In some cases, an electric field associated with the generated energy may be distorted or attenuated at a UE, for example due to an obstacle (e.g., a hand, a phone cover) blocking antenna gains in the INC region.

According to the techniques described herein, a UE may be configured to select a set of beams to generate energy in a first coverage region (e.g., an OOC region) to reduce the effects of a distorted electric field. The UE may select the set of beams based on gain parameters associated with a set of antennas at the UE, where the gain parameters are determined for communications in a second coverage region (e.g., an INC region). In some examples, the UE may use iterative techniques to select the beams, which may correspond to a set of basis vectors for a beamspace of the first coverage region. In some examples, the UE may select the set of beams based on calculations using a set of codebook beams associated with the second coverage region. In some examples, the UE may additionally select the set of beams for communications in the second coverage region, such that the set of beams may correspond to a set of basis vectors for a beamspace of the first coverage region and the second coverage region.

Aspects of the disclosure are initially described in the context of wireless communications systems. Aspects of the disclosure are further illustrated by and described with reference to a field diagram, apparatus diagrams, system diagrams, and flowcharts that relate to techniques for separated beam design.

Figure 1:
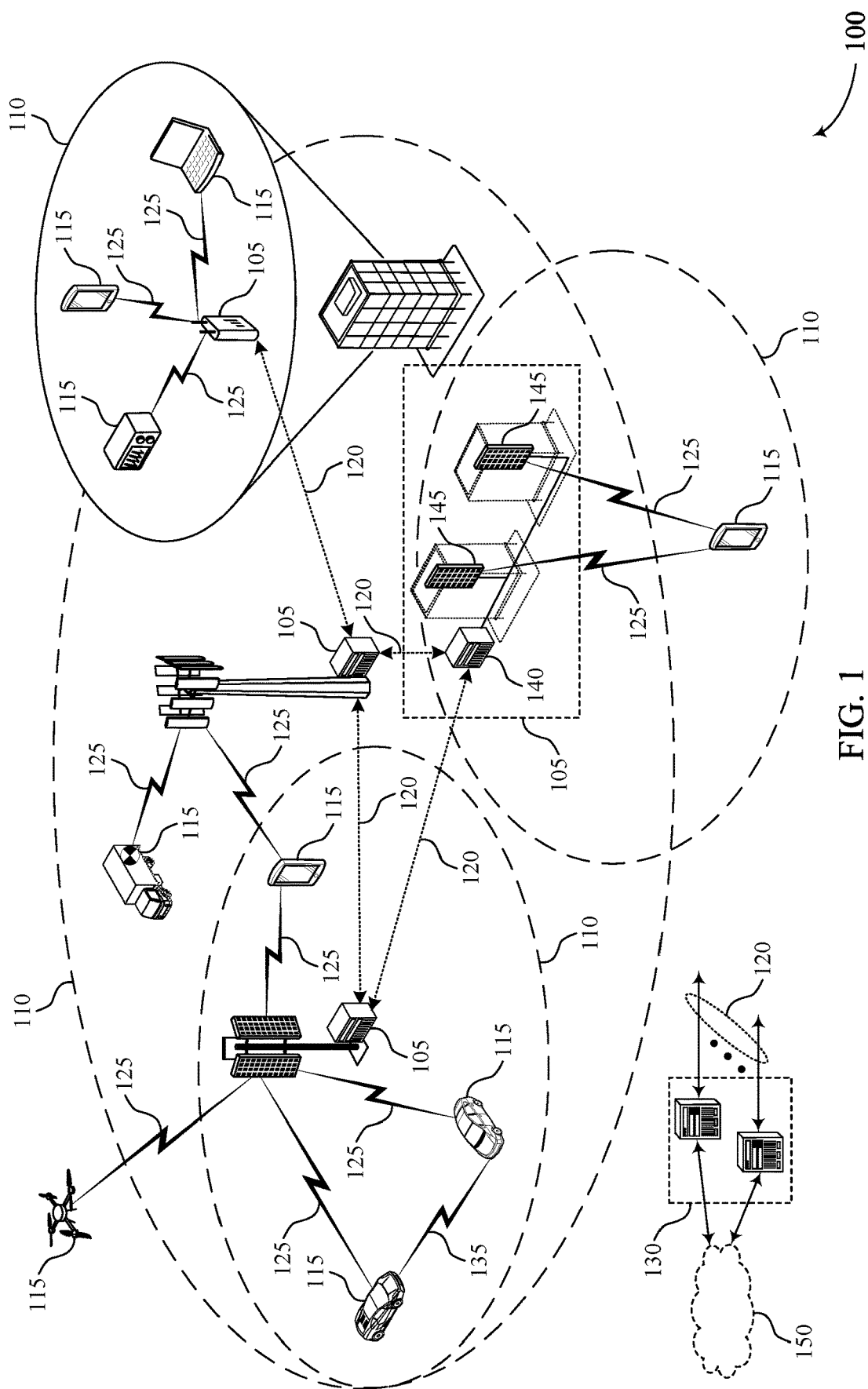
FIG. 1 illustrates an example of a wireless communications system that supports techniques for separated beam design in accordance with aspects of the present disclosure.

FIG. 1 illustrates an example of a wireless communications system 100 that supports techniques for separated beam design in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, a UE 115 may be configured to select a set of beams to generate energy in a first coverage region (e.g., an OOC region) to reduce the effects of a distorted electric field on communications with a base station 105. The UE 115 may select the set of beams based on gain parameters associated with a set of antennas at the UE 115, where the gain parameters are determined for communications in a second coverage region (e.g., an INC region). In some examples, the UE 115 may use iterative techniques to select the beams, which may correspond to a set of basis vectors for a beamspace of the first coverage region. In some examples, the UE 115 may select the set of beams based on calculations using a set of codebook beams associated with the second coverage region. In some examples, the UE 115 may additionally select the set of beams for communications in the second coverage region, such that the set of beams may correspond to a set of basis vectors for a beamspace of the first coverage region and the second coverage region.

Figure 2:
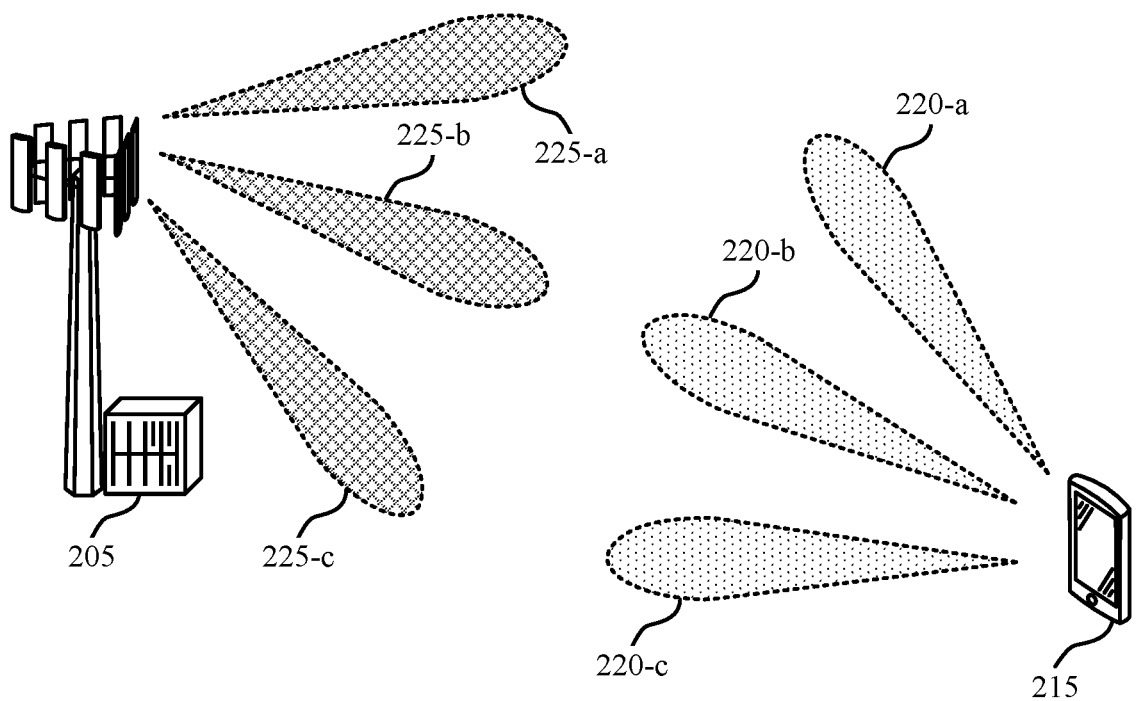
FIG. 2 illustrates an example of a wireless communications system that supports techniques for separated beam design in accordance with aspects of the present disclosure.
Figure 2:
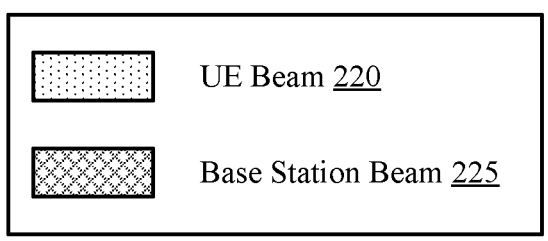

FIG. 2 illustrates an example of a wireless communications system 200 that supports techniques for separated beam design in accordance with aspects of the present disclosure. In some examples, the wireless communications system 200 may implement aspects of the wireless communications system 100. For example, the wireless communications system 200 may include a base station 205 and a UE 215, which may be examples of the corresponding devices described with reference to FIG. 1. The wireless communications system 200 may include features for improved communications between the UE 215 and the base station 205, among other benefits.

The base station 205 may communicate with the UE 215 using beamforming techniques. For example, the base station 205 and the UE 215 may communicate with one another via one or more base station beams 225 and one or more UE beams 220. Individual base station beams 225 may correspond to individual UE beams 220 for communications in the wireless communications system 200. In some examples, the communications illustrated in FIG. 2 may include downlink transmissions to the UE 215, where the base station beams 225 may be transmission beams and the UE beams 220 may be reception beams. Additionally or alternatively, the communications illustrated in FIG. 2 may include uplink transmissions from the UE 215, where the base station beams 225 may be reception beams and the UE beams 220 may be transmission beams.

The UE 215 may train UE beams 220 to communicate in directions corresponding to an INC region, which may increase antenna gains for transmissions sent or received by the UE beams 220 in the INC region at the expense of gains in directions corresponding to an OOC region. In some cases, an electric field associated with generated energy based on the UE beams 220 may be distorted or attenuated at the UE 215, for example due to an obstacle (e.g., a hand, a phone cover) blocking antenna gains in the INC region. Additionally or alternatively, a base station beam 225 from the base station 205 may arrive at an angle outside the INC region, for example due to motion of the UE 215, which may lead to sub-optimal performance of beamformed communications.

According to the techniques described herein, the UE 215 may be configured to select a set of UE beams 220 to generate energy in a first coverage region (e.g., the OOC region) to reduce the effects of a distorted electric field. The UE 220 may select the set of UE beams 220 based on gain parameters associated with a set of antennas at the UE 220, where the gain parameters are determined for communications in a second coverage region (e.g., the INC region). In some examples, the UE 215 may select the set of UE beams 220 based on calculations using a set of codebook beams associated with the second coverage region.

In some examples, the UE 215 may select the set of UE beams 220 using iterative techniques. The UE 215 may determine to select a quantity N of UE beams 220 from a set of y possible UE beams 220. The UE 215 may select an initial UE beam 220 (e.g., a UE beam 220-$a$), which may be referred to as a beam $w_1$. The beam $w_1$ may be calculated using the formula:

$$w_1 = \text{argmin}_{w \in \mathcal{Y}}(\text{INCsumGainUnit1}(w) + \text{INCsumGainUnit2}(w) + \text{INCsumGainUnit3}(w) + \text{INCsumGainUnit4}(w)), \quad (1)$$

where the function $\text{argmin}_{w \in \mathcal{Y}}$ identifies the beam w from the set $\mathcal{Y}$ that returns the minimum values for sum gain calculations corresponding to a quantity of units (e.g., antenna elements at the UE 215, or at another UE). That is, the beam $w_1$ may be calculated such that the beam $w_1$ has a minimum contribution to the second coverage region (e.g., the INC region). Although the formula form illustrates sum gain calculations using four units, the UE 215 may calculate $w_1$ using any quantity of units. In some examples, the UE 215 may use a normalized electric field for the sum gain calculations.

The UE 215 may select the remaining UE beams 220 of the set $\mathcal{W} = \{w_1, \ldots, w_N\}$ using an iterative procedure based on the initial beam $w_1$ and a set of codebook beams $c_1, \ldots, c_Q$, associated with the second coverage region. The beam $w_1$ may be removed from the set $\mathcal{Y}$ (i.e., $\mathcal{Y} = \mathcal{Y}/\{w_1\}$) for the iterative procedure. Each iteration k of the iterative procedure may be described mathematically or programmatically as follows:

1. Calculate $w_{k+1} = \text{argmin}_{y \in \mathcal{Y}}(\max(\text{Real}(y^H w_1), \ldots, \text{Real}(y^H w_k), \text{Real}(y^H c_1), \ldots, \text{Real}(y^H c_Q)))$.
2. Set $\mathcal{Y} = \mathcal{Y}/\{w_{k+1}\}$.
3. Set k=k+1. If k<N, go to step 1, else stop.

In each iteration k, the UE 215 may calculate a beam $w_{k+1}$, where the function $\text{argmin}_{y \in \mathcal{Y}}$ identifies the beam y from the set $\mathcal{Y}$ that returns minimum values based on the previously calculated beams $w_1, \ldots, w_k$ and the set of codebook beams $c_1, \ldots, c_Q$, where $\text{Real}(y^H w_1)$ represents the real part of the product of a Hermitian conjugate of the beam y and the beam $w_1$. That is, the UE 215 may calculate the beam $w_{k+1}$ such that the beam $w_{k+1}$ has a maximum angular separation from the previously calculated beams $w_1, \ldots, w_k$ and the set of codebook beams $c_1, \ldots, c_Q$. After calculating the beam $w_{k+1}$, the UE 215 may remove the beam $w_{k+1}$ from the set $\mathcal{Y}$ for the iteration k+1. After N iterations, the UE 215 may stop the iterative procedure. Based on the iterative procedure, the UE 215 may select the set $\mathcal{W}$ of UE beams 220, where $\mathcal{W} = \{w_1, \ldots, w_N\}$. The set $\mathcal{W}$ of UE beams 220 may correspond to a set of basis vectors for a null space of a subspace of the set of codebook beams associated with the second coverage region.

Additionally or alternatively, the UE 215 may select a second set of UE beams 220 to generate energy in the first coverage region (e.g., the OOC region) and the second coverage region (e.g., the INC region). The UE 215 may select the second set of UE beams 220 using iterative techniques. The UE 215 may determine to select a quantity N of UE beams 220 from the set of $\mathcal{Y}$ possible UE beams 220. The UE 215 may select an initial UE beam 220 (e.g., a UE beam 220-$b$), which may be referred to as a beam $w_1$. The beam $w_1$ may be calculated using the formula:

$$w_1 = \text{argmax}_{w \in \mathcal{Y}}(\text{INCsumGainUnit1}(w) + \text{INCsumGainUnit2}(w) + \text{INCsumGainUnit3}(w) + \text{INCsumGainUnit4}(w)), \quad (2)$$

where the function $\text{argmax}_{w \in \mathcal{Y}}$ identifies the beam w from the set $\mathcal{Y}$ that returns the maximum values for sum gain calculations corresponding to the quantity of units (e.g., the antenna elements at the UE 215, or at another UE). That is, the beam $w_1$ may be calculated such that the beam $w_1$ has a maximum contribution to the second coverage region (e.g., the INC region). Although the formula for $w_1$ illustrates sum gain calculations using four units, the UE 215 may calculate $w_1$ using any quantity of units. In some examples, the UE 215 may use a normalized electric field for the sum gain calculations.

The UE 215 may select the remaining UE beams 220 of the second set $\mathcal{W} = \{w_1, \ldots, w_N\}$ of UE beams 220 using an iterative procedure based on the initial beam $w_1$. The beam $w_1$ may be removed from the set $\mathcal{Y}$ (i.e., $\mathcal{Y} = \mathcal{Y}/\{w_1\}$) for the iterative procedure. Each iteration k of the iterative procedure may be described mathematically or programmatically as follows:

1. Calculate $w_{k+1} = \text{argmin}_{y \in \mathcal{Y}}(\max(\text{Real}(y^H w_1), \ldots, \text{Real}(y^H w_k)))$
2. Set $\mathcal{Y} = \mathcal{Y}/\{w_{k+1}\}$.
3. Set k=k+1. If k<N, go to step 1, else stop.

In each iteration k, the UE 215 may calculate a beam $w_{k+1}$, where the function $\text{argmin}_{y \in \mathcal{Y}}$ identifies the beam y from the set $\mathcal{Y}$ that returns minimum values based on the previously calculated beams $w_1, \ldots, w_k$. That is, the UE 215 may calculate the beam $w_{k+1}$ such that the beam $w_{k+1}$ has a maximum angular separation from the previously calculated beams $w_1, \ldots, w_k$. After calculating the beam $w_{k+1}$, the UE 215 may remove the beam $w_{k+1}$ from the set $\mathcal{Y}$ for the iteration k+1. After N iterations, the UE 215 may stop the iterative procedure. Based on the iterative procedure, the UE 215 may select the second set W of UE beams 220, where $\mathcal{W} = \{w_1, \ldots, w_N\}$. The second set $\mathcal{W}$ of UE beams 220 may correspond to a set of basis vectors for a beamspace associated with the first coverage region and the second coverage region.

Figure 3:
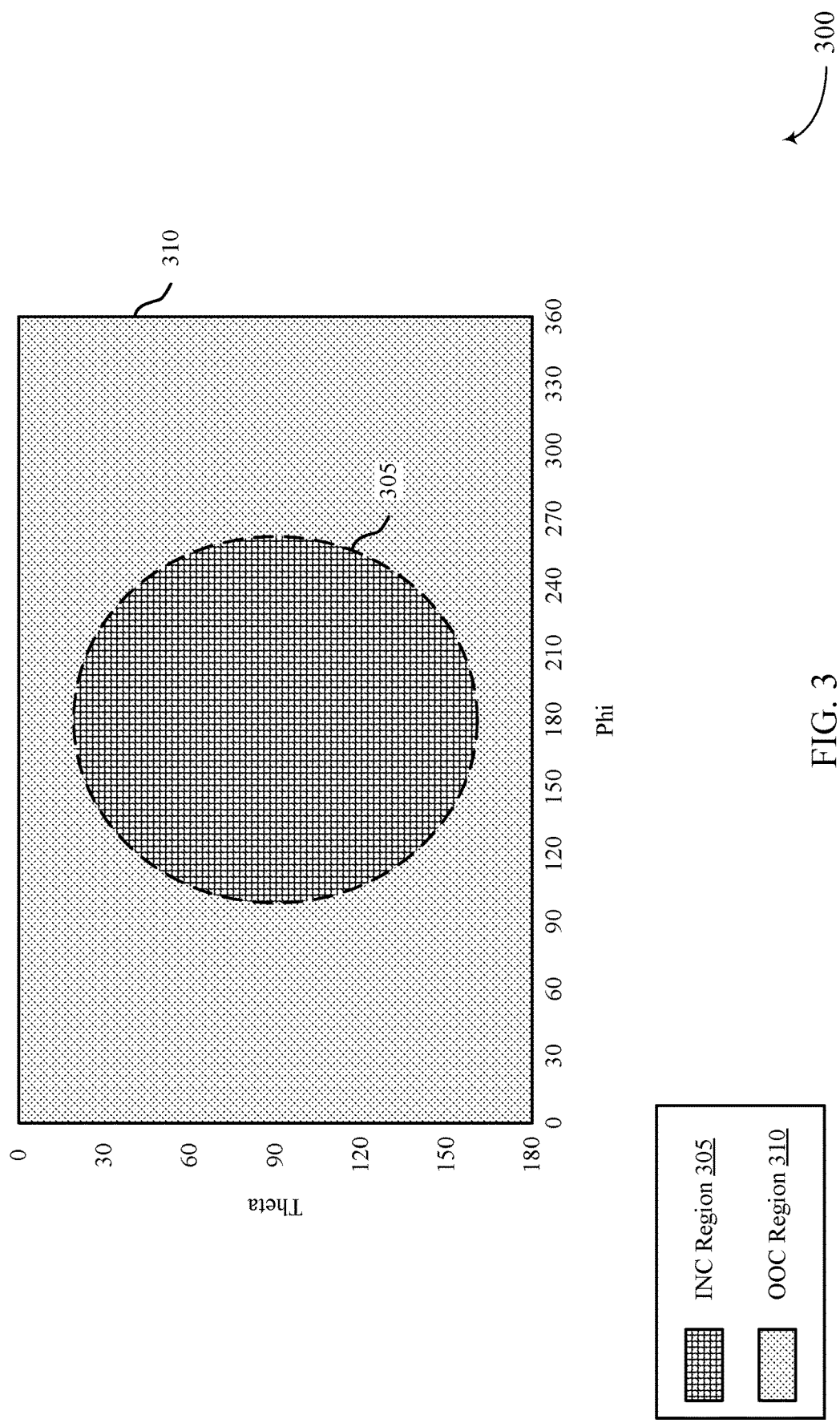
FIG. 3 illustrates an example of a field diagram that supports techniques for separated beam design in accordance with aspects of the present disclosure.

FIG. 3 illustrates an example of a field diagram 300 that supports techniques for separated beam design in accordance with aspects of the present disclosure. In some examples, the field diagram 300 may implement aspects of the wireless communications system 100 or the wireless communications system 200. For example, the field diagram 300 may illustrate an electric field that includes energy generated by an antenna element or a set of antennas at a UE for communications with a base station, which may be examples of the corresponding devices described with reference to FIGS. 1 and 2. The field diagram 300 may illustrate features for improved communications between the UE and the base station, among other benefits.

The field diagram 300 may illustrate the electric field in a spherical coordinate plane corresponding to orientations or directions with respect to the UE. A horizontal axis of the field diagram 300 may correspond to an azimuthal angle about the UE, which may be referred to as phi or ϕ. A vertical axis of the field diagram 300 may correspond to a polar angle or inclination, which may be referred to as theta or θ. The field diagram 300 may include an INC region 305 and an OOC region 310. The UE may generate energy using the set of antennas, which may be combined such that signals propagating in one or more directions may experience an antenna gain based on constructive interference of the generated energy. The INC region 305 may include the direction with a peak antenna gain and a coverage area with antenna gains near the peak gain (e.g., antenna gains within 6 decibels (dB) of the peak gain). The OOC region 310 may include directions with reduced antenna gain, for example based on destructive interference of the generated energy.

In some cases, the electric field in the OOC region 310 (i.e., the area outside the INC region 305) may be unstructured, and the electric field may vary from one antenna element to another. The UE may generate energy using beams designed to increase throughput in the INC region 305, which may result in sub-optimal antenna gains in the OOC region 310. In some examples, a serving beam from the base station may arrive at an angle outside the INC region 305, such as due to motion of the UE, which may lead to sub-optimal performance of beamformed communications.

In some cases, when the set of antennas has an unstructured electric field, which may not be concentrated in any direction (e.g., not concentrated in the INC region 305), the mmW beams designed for the INC region 305 based on electric field data may not give optimal antenna gains, for example due to a high directivity of the beams. In some cases, the electric field may experience attenuation or loss of structure, for example due to an obstacle (e.g., a hand, a phone cover, or another obstacle) blocking the set of antennas. Accordingly, beams designed to serve the INC region 305 based on the electric field data of the set of antennas may give sub-optimal throughput gains for the UE. It may be beneficial to use a beam design algorithm with less dependency on electric field data for the set of antennas which may maintain antenna gains over the INC region 305.

According to the techniques described herein, the UE may be configured to select a set of beams to generate energy in the OOC region 310, either instead of or in addition to generating energy in the INC region 305. In some examples, the UE may select the set of beams based on variation in the electric field of the OOC region 310 from one antenna element to another, an unstructured electric field, or both. The UE may use electric fields from multiple antenna elements or sets of antennas to estimate the variation. In some examples, the UE may select the set of beams such that a quantity of beams serving the OOC region 310 is minimized. In some examples, the UE may select beams such that a separation between the beams is maximized. In some examples, such as when the UE selects the set of beams to generate energy in the OOC region 310, the UE may select beams that correspond to a set of basis vectors for a null space of a subspace of a set of codebook beams associated with the INC region 305. Additionally or alternatively, such as when the UE selects the set of beams to generate energy in the OOC region 310 and the INC region 305, the UE may select beams that correspond to basis vectors for a beam-space (e.g., the entire sphere represented by the field diagram 300). In some examples, the UE may select the set of beams using iterative techniques, which may improve throughput gains over the entire sphere represented by the field diagram 300.

Figure 4:
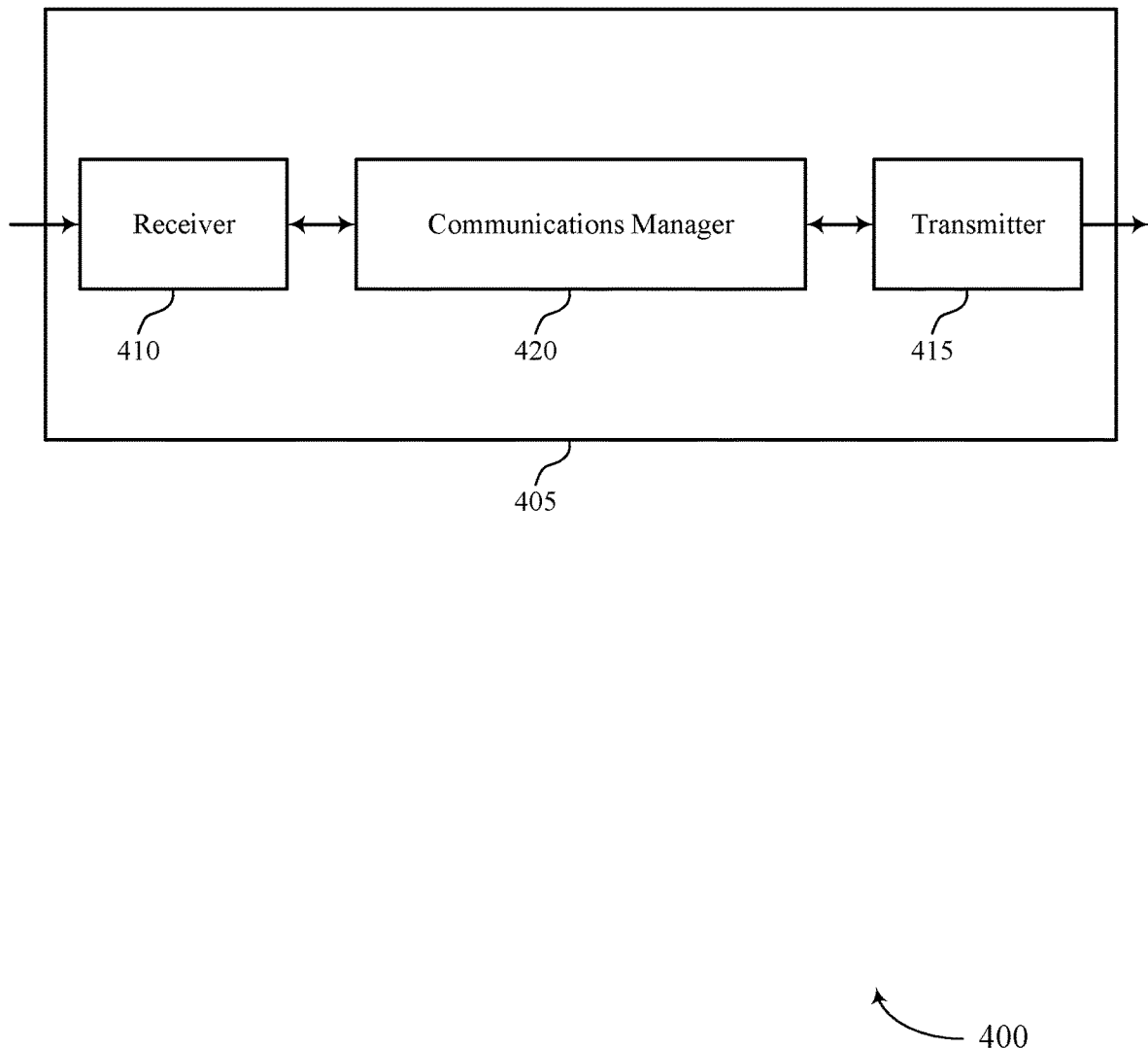
FIGS. 4 and 5 show block diagrams of devices that support techniques for separated beam design in accordance with aspects of the present disclosure.

FIG. 4 shows a block diagram 400 of a device 405 that supports techniques for separated beam design in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for separated beam design). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to size-based neural network selection for autoencoder-based communication). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for separated beam design as described herein. For example, the communications manager 420, the receiver 410, the transmitter 415, or various combinations thereof or various components thereof may support a method for performing one or more of the functions described herein.

In some examples, the communications manager 420, the receiver 410, the transmitter 415, or various combinations thereof or components thereof, may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations thereof or components thereof, may be implemented in code (e.g., as communications management software or firmware) executed by a processor. If implemented in code executed by a processor, the functions of the communications manager 420, the receiver 410, the transmitter 415, or various combinations thereof or components thereof, may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for selecting a set of beams for first communications in a first coverage region based on a set of gain parameters associated with a set of antennas, the set of gain parameters associated with second communications in a second coverage region. The communications manager 420 may be configured as or otherwise support a means for identifying an energy generated by the selected set of beams in the first coverage region. The communications manager 420 may be configured as or otherwise support a means for communicating with a device via the selected set of beams based on the generated energy.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reducing power consumption and increasing transmission reliability. In some aspects, the processor of the device 405 may adjust beamformed communications based on selecting the set of beams. For example, the processor of the device 405 may turn on one or more processing units for processing gain calculations, increase a processing clock, or a similar mechanism within the device 405. As such, when subsequent electric field distortions are detected, the processor may more accurately communicate data packets. Improvements in beamforming may result in improvements in power saving and communications reliability, which may further increase power efficiency at the device 405 (e.g., by eliminating unnecessary repeated communications).

Figure 5:
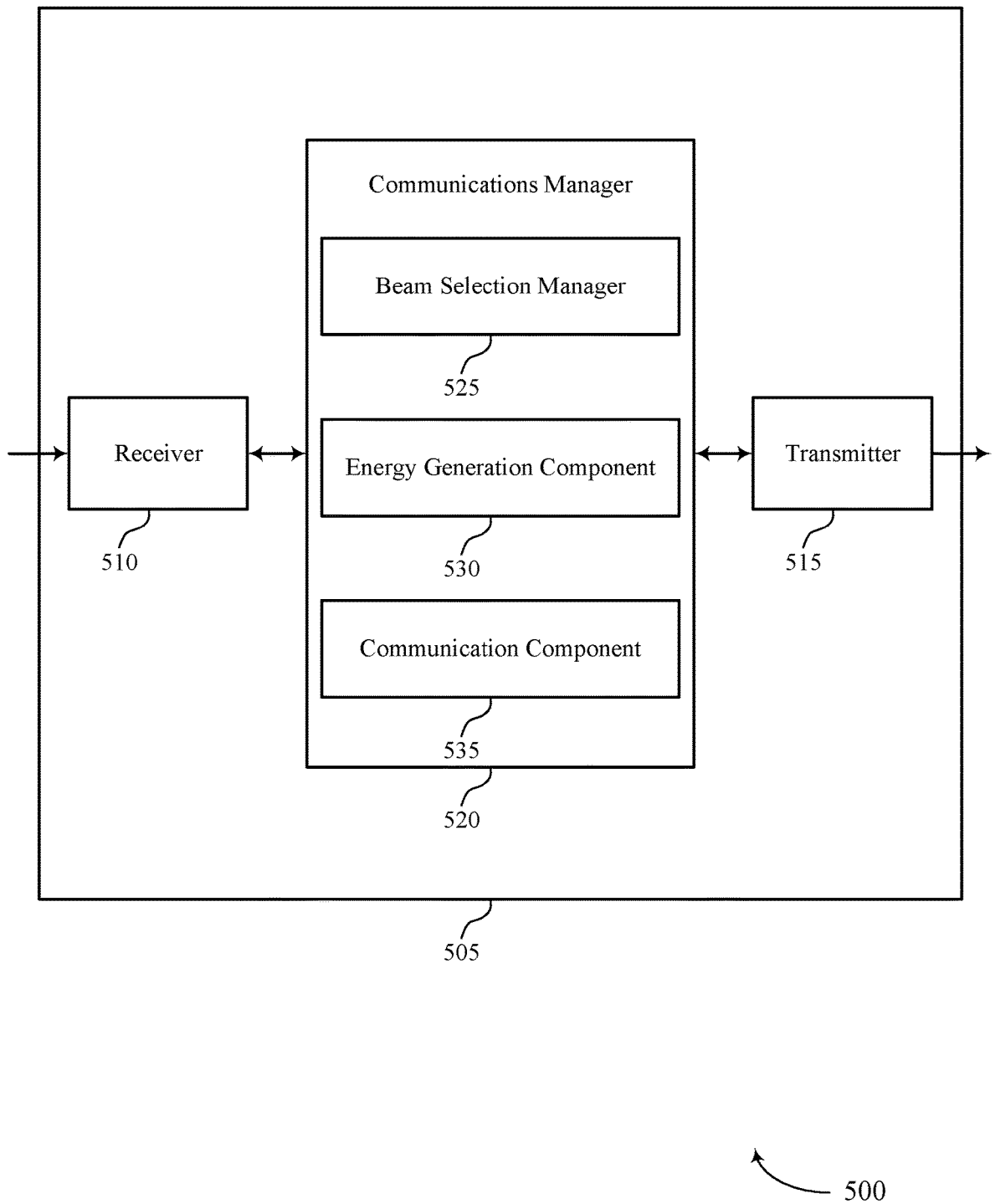

FIG. 5 shows a block diagram 500 of a device 505 that supports techniques for separated beam design in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for separated beam design). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to size-based neural network selection for autoencoder-based communication). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for separated beam design as described herein. For example, the communications manager 520 may include a beam selection manager 525, an energy generation component 530, a communication component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The beam selection manager 525 may be configured as or otherwise support a means for selecting a set of beams for first communications in a first coverage region based on a set of gain parameters associated with a set of antennas, the set of gain parameters associated with second communications in a second coverage region. The energy generation component 530 may be configured as or otherwise support a means for identifying an energy generated by the selected set of beams in the first coverage region. The communication component 535 may be configured as or otherwise support a means for communicating with a device via the selected set of beams based on the generated energy.

Figure 6:
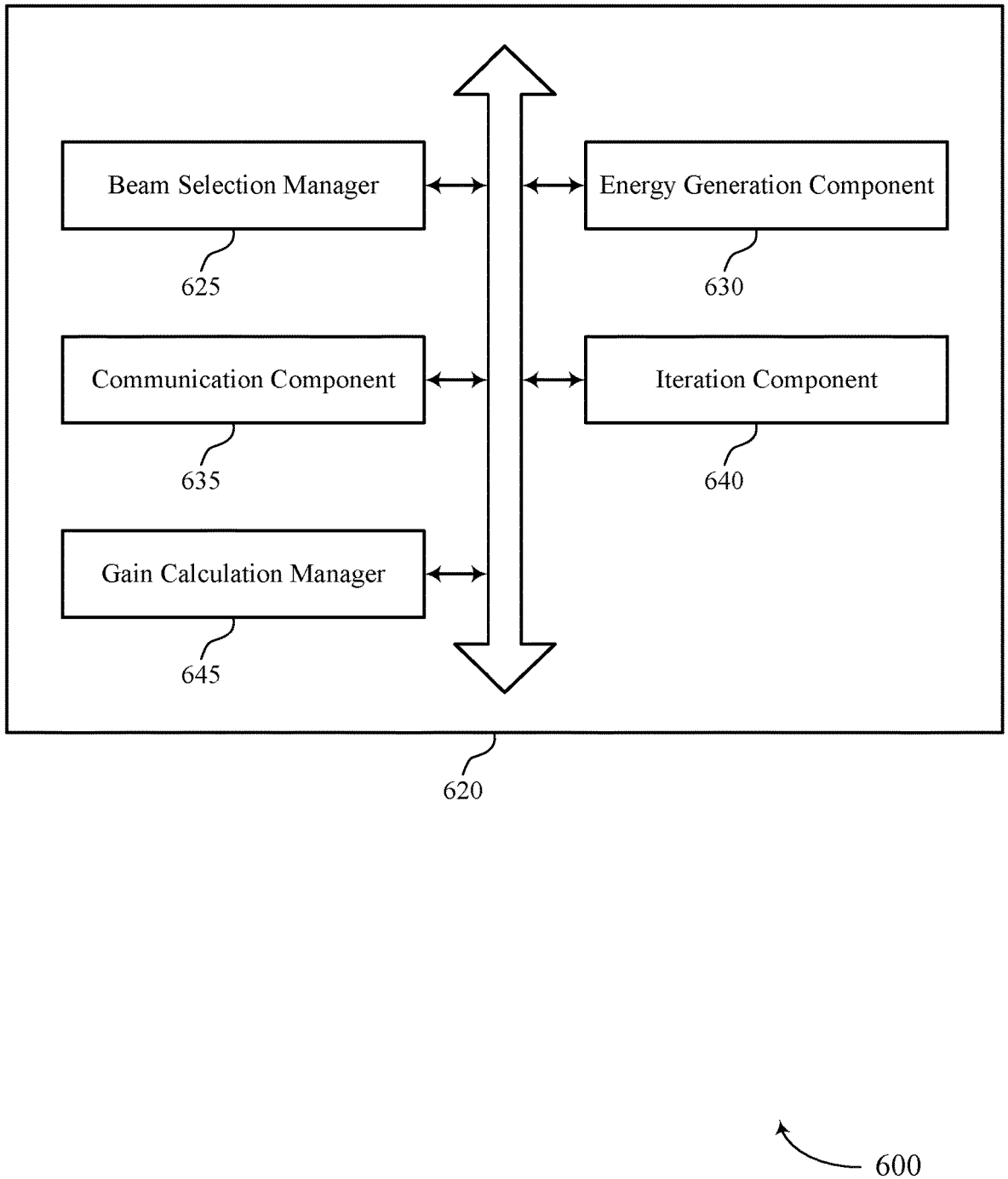
FIG. 6 shows a block diagram of a communications manager that supports techniques for separated beam design in accordance with aspects of the present disclosure.

FIG. 6 shows a block diagram 600 of a communications manager 620 that supports techniques for separated beam design in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for separated beam design as described herein. For example, the communications manager 620 may include a beam selection manager 625, an energy generation component 630, a communication component 635, an iteration component 640, a gain calculation manager 645, or any combination thereof. Each of these components may communicate, directly or indirectly, with one another (e.g., via one or more buses).

The communications manager 620 may support wireless communications at a UE in accordance with examples as disclosed herein. The beam selection manager 625 may be configured as or otherwise support a means for selecting a set of beams for first communications in a first coverage region based on a set of gain parameters associated with a set of antennas, the set of gain parameters associated with second communications in a second coverage region. The energy generation component 630 may be configured as or otherwise support a means for identifying an energy generated by the selected set of beams in the first coverage region. The communication component 635 may be configured as or otherwise support a means for communicating with a device via the selected set of beams based on the generated energy.

In some examples, to support selecting the set of beams, the beam selection manager 625 may be configured as or otherwise support a means for selecting the set of beams for the second communications in the second coverage region based on the set of gain parameters, where the energy is further generated by the selected set of beams in the second coverage region.

In some examples, the beam selection manager 625 may be configured as or otherwise support a means for enabling the selected set of beams to be associated with a set of basis vectors of a beamspace associated with the first coverage region and the second coverage region.

In some examples, the beam selection manager 625 may be configured as or otherwise support a means for enabling the selected set of beams to be associated with a set of basis vectors of a beamspace that includes a null space of a subspace associated with a set of codebook beams, the set of codebook beams associated with the second communications in the second coverage region.

In some examples, to support selecting the set of beams, the iteration component 640 may be configured as or otherwise support a means for selecting a first beam based on the set of gain parameters. In some examples, to support selecting the set of beams, the iteration component 640 may be configured as or otherwise support a means for updating a pool of beams to exclude the selected first beam. In some examples, to support selecting the set of beams, the iteration component 640 may be configured as or otherwise support a means for performing a selection procedure to select additional beams based on the selected first beam, where the selection procedure includes one or more iterations.

In some examples, to support each iteration of the one or more iterations of the selection procedure, the iteration component 640 may be configured as or otherwise support a means for selecting an additional beam based on the selected first beam, a prior iteration of the selection procedure, or both. In some examples, to support each iteration of the one or more iterations of the selection procedure, the iteration component 640 may be configured as or otherwise support a means for updating the updated pool of beams to exclude the selected additional beam.

In some examples, the beam selection manager 625 may be configured as or otherwise support a means for determining a separation parameter associated with the selected set of beams, where the selected set of beams are selected based on the determined separation parameter.

In some examples, the gain calculation manager 645 may be configured as or otherwise support a means for determining the set of gain parameters based on performing a set of gain calculations using a normalized electric field for each antenna of the set of antennas.

In some examples, the beam selection manager 625 may be configured as or otherwise support a means for enabling the selected set of beams to be selected based on a set of codebook beams associated with the second communications in the second coverage region.

In some examples, the first coverage region includes an out-of-coverage region. In some examples, the second coverage region includes an in-coverage region.

Figure 7:
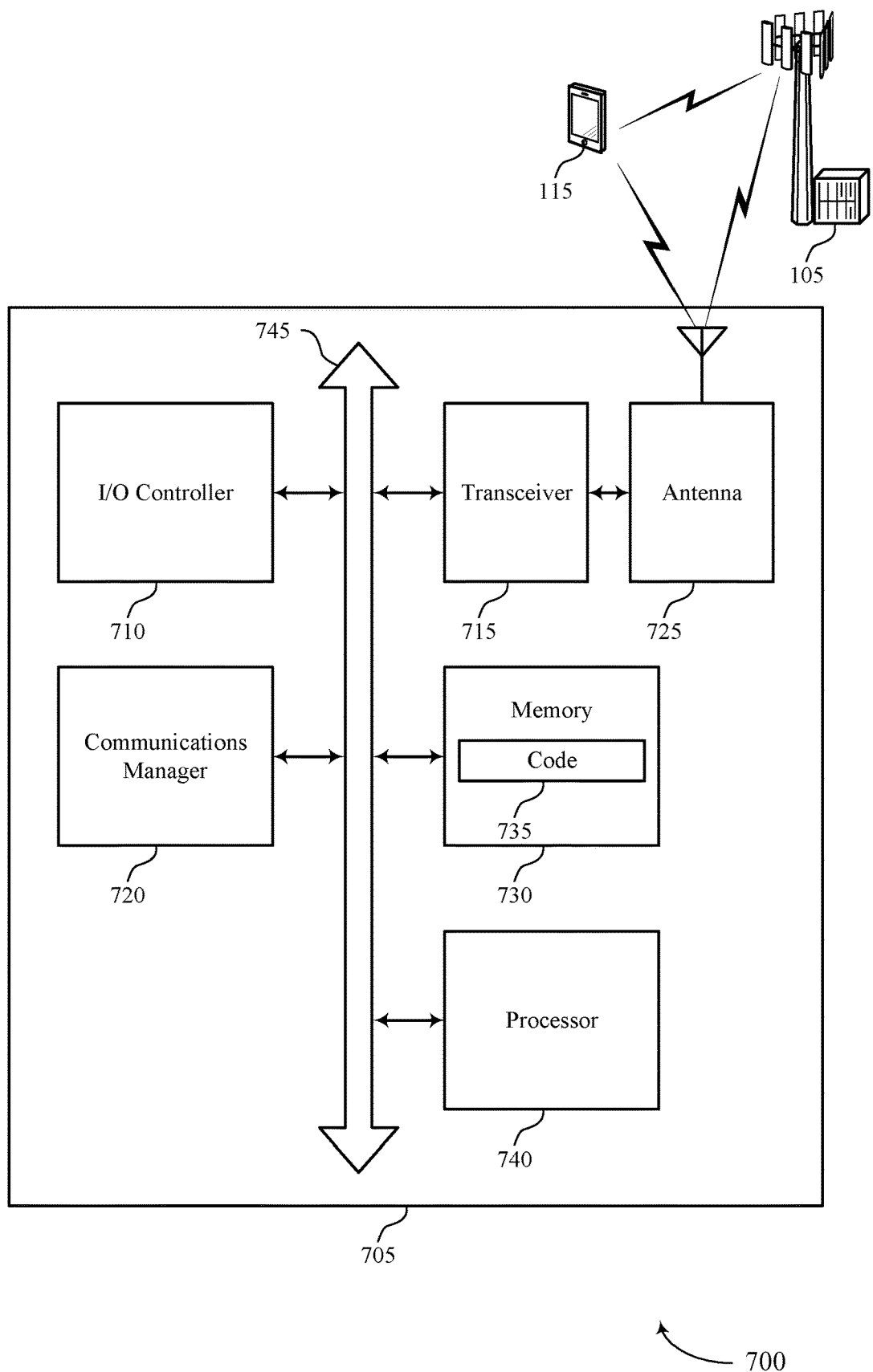
FIG. 7 shows a diagram of a system including a device that supports techniques for separated beam design in accordance with aspects of the present disclosure.

FIG. 7 shows a diagram of a system 700 including a device 705 that supports techniques for separated beam design in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, including a communications manager 720, an I/O controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In some other cases, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets and provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or other type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for separated beam design). For example, the device 705 or a component of the device 705 may include a processor 740 and memory 730 coupled with the processor

740, the processor 740 and memory 730 configured to perform various functions described herein.

The communications manager 720 may support wireless communications at a UE in accordance with examples as disclosed herein. For example, the communications manager 720 may be configured as or otherwise support a means for selecting a set of beams for first communications in a first coverage region based on a set of gain parameters associated with a set of antennas, the set of gain parameters associated with second communications in a second coverage region. The communications manager 720 may be configured as or otherwise support a means for identifying an energy generated by the selected set of beams in the first coverage region. The communications manager 720 may be configured as or otherwise support a means for communicating with a device via the selected set of beams based on the generated energy.

By including or configuring the communications manager 720 in accordance with examples as described herein, the device 705 may support techniques for saving power by communicating with base stations 105 (as shown in FIG. 1) in communications more efficiently. For example, the device 705 may improve reliability in communications with base stations 105, as the device 705 may be able to determine, based on selecting the set of beams, whether a transmission is likely to be successful. Using the techniques described herein, the device 705 may more accurately communicate with base stations 105, which may improve power efficiency at the device 705.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for separated beam design as described herein, or the processor 740 and the memory 730 may be otherwise configured to perform or support such operations.

Figure 8:
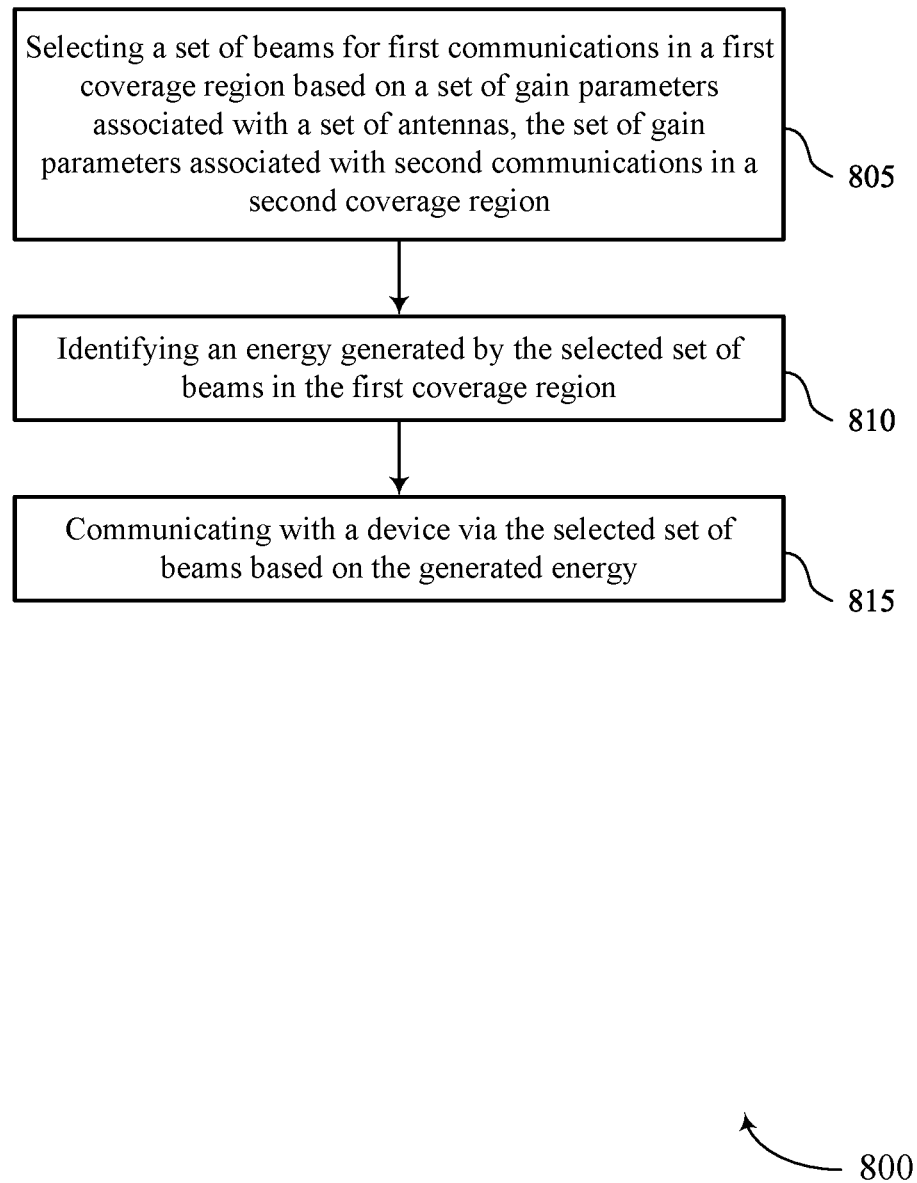
FIGS. 8 and 9 show flowcharts illustrating methods that support techniques for separated beam design in accordance with aspects of the present disclosure.

FIG. 8 shows a flowchart illustrating a method 800 that supports techniques for separated beam design in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include selecting a set of beams for first communications in a first coverage region based on a set of gain parameters associated with a set of antennas, the set of gain parameters associated with second communications in a second coverage region. The operations of 805 may be performed in accordance with examples as disclosed herein. In some examples, aspects of the operations of 805 may be performed by a beam selection manager 625 as described with reference to FIG. 6.

At 810, the method may include identifying an energy generated by the selected set of beams in the first coverage region. The operations of 810 may be performed in accordance with examples as disclosed herein. In some examples, aspects of the operations of 810 may be performed by an energy generation component 630 as described with reference to FIG. 6.

At 815, the method may include communicating with a device via the selected set of beams based on the generated energy. The operations of 815 may be performed in accordance with examples as disclosed herein. In some examples, aspects of the operations of 815 may be performed by a communication component 635 as described with reference to FIG. 6.

Figure 9:
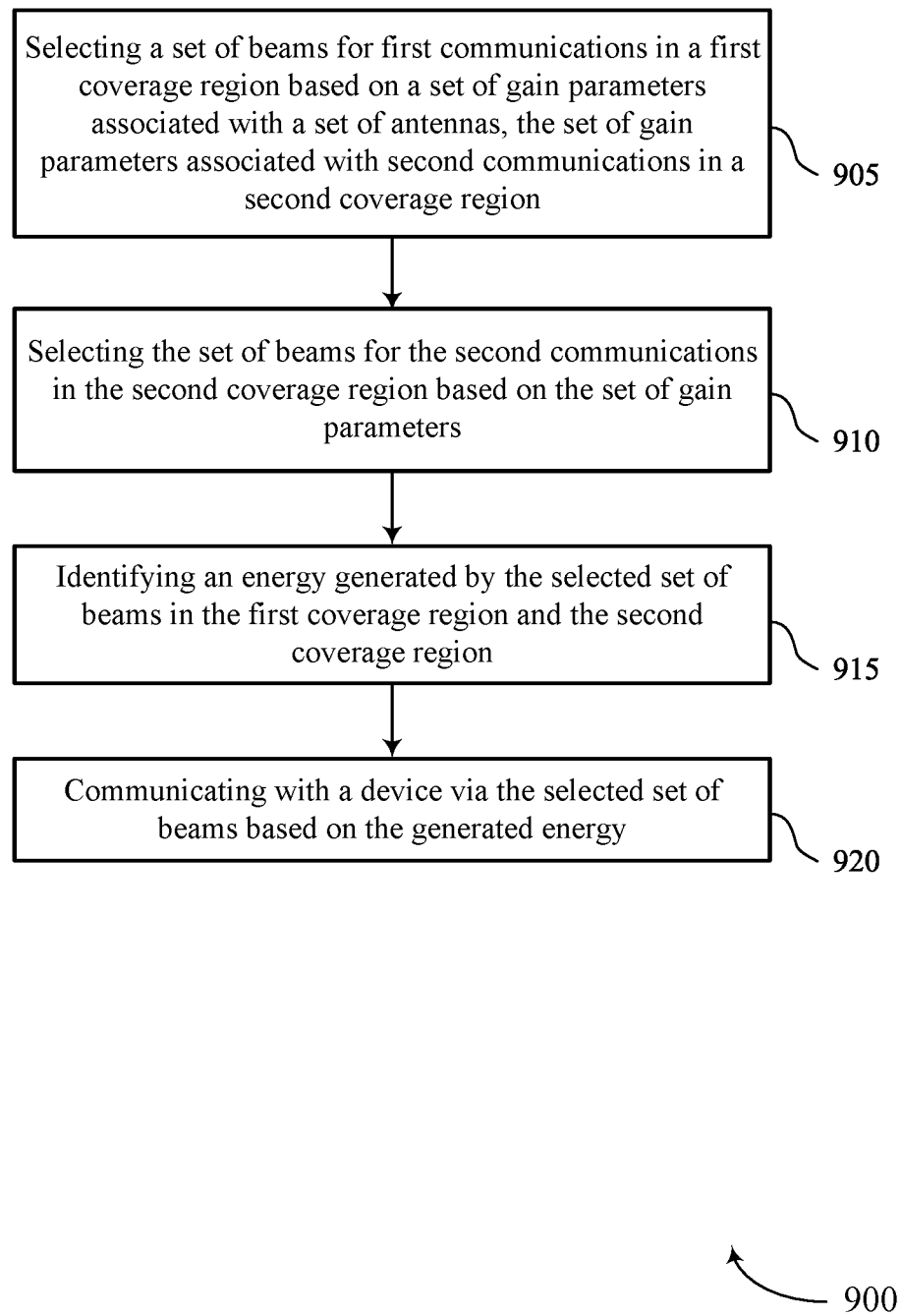

FIG. 9 shows a flowchart illustrating a method 900 that supports techniques for separated beam design in accordance with aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include selecting the set of beams for the second communications in the second coverage region based on the set of gain parameters. The operations of 905 may be performed in accordance with examples as disclosed herein. In some examples, aspects of the operations of 905 may be performed by a beam selection manager 625 as described with reference to FIG. 6.

At 910, the method may include selecting the set of beams for the second communications in the second coverage region based on the set of gain parameters, where the energy is further generated by the selected set of beams in the second coverage region. The operations of 910 may be performed in accordance with examples as disclosed herein. In some examples, aspects of the operations of 910 may be performed by a beam selection manager 625 as described with reference to FIG. 6.

At 915, the method may include identifying an energy generated by the selected set of beams in the first coverage region and the second coverage region. The operations of 915 may be performed in accordance with examples as disclosed herein. In some examples, aspects of the operations of 915 may be performed by an energy generation component 630 as described with reference to FIG. 6.

At 920, the method may include communicating with a device via the selected set of beams based on the generated energy. The operations of 920 may be performed in accordance with examples as disclosed herein. In some examples, aspects of the operations of 920 may be performed by a communication component 635 as described with reference to FIG. 6.

The following provides an overview of aspects of the present disclosure:

Aspect 1: A method for wireless communications at a UE, comprising: selecting a set of beams for first communications in a first coverage region based at least in part on a set of gain parameters associated with a set of antennas, the set of gain parameters associated with second communications in a second coverage region; identifying an energy generated by the selected set of beams in the first coverage region; and communicating with a device via the selected set of beams based at least in part on the generated energy.

Aspect 2: The method of aspect 1, wherein selecting the set of beams further comprises: selecting the set of beams for the second communications in the second coverage region based at least in part on the set of gain parameters, wherein the energy is further generated by the selected set of beams in the second coverage region.

Aspect 3: The method of aspect 2, wherein the selected set of beams are associated with a set of basis vectors of a beamspace associated with the first coverage region and the second coverage region.

Aspect 4: The method of any of aspects 1 through 3, wherein the selected set of beams are associated with a set of basis vectors of a beamspace that includes a null space of a subspace associated with a set of codebook beams, the set of codebook beams associated with the second communications in the second coverage region.

Aspect 5: The method of any of aspects 1 through 4, wherein selecting the set of beams comprises: selecting a first beam based at least in part on the set of gain parameters; updating a pool of beams to exclude the selected first beam; and performing a selection procedure to select additional beams based at least in part on the selected first beam, wherein the selection procedure includes one or more iterations.

Aspect 6: The method of aspect 5, wherein each iteration of the one or more iterations of the selection procedure comprises: selecting an additional beam based at least in part on the selected first beam, a prior iteration of the selection procedure, or both; and updating the updated pool of beams to exclude the selected additional beam.

Aspect 7: The method of any of aspects 1 through 6, further comprising: determining a separation parameter associated with the selected set of beams, wherein the selected set of beams are selected based at least in part on the determined separation parameter.

Aspect 8: The method of any of aspects 1 through 7, further comprising: determining the set of gain parameters based at least in part on performing a set of gain calculations using a normalized electric field for each antenna of the set of antennas.

Aspect 9: The method of any of aspects 1 through 8, wherein the selected set of beams are selected based at least in part on a set of codebook beams associated with the second communications in the second coverage region.

Aspect 10: The method of any of aspects 1 through 9, wherein the first coverage region includes an out-of-coverage region; and the second coverage region includes an in-coverage region.

Aspect 11: An apparatus for wireless communications at a UE, comprising a processor; memory coupled with the processor; and instructions stored in the memory and executable by the processor to cause the apparatus to perform a method of any of aspects 1 through 10.

Aspect 12: An apparatus for wireless communications at a UE, comprising at least one means for performing a method of any of aspects 1 through 10.

Aspect 13: A non-transitory computer-readable medium storing code for wireless communications at a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    selecting a first set of beams for first communications in a first coverage region and a second set of beams for second communications in a second coverage region, wherein selection of the first set of beams is based at least in part on a set of gain parameters associated with a set of antennas and with the second communications, wherein the first coverage region is different from the second coverage region;
    identifying an energy generated by the first set of beams in the first coverage region, wherein the energy is generated for the first coverage region in accordance with the set of gain parameters associated with the second coverage region; and
    communicating with a device via the first set of beams based at least in part on the generated energy.

2. The method of claim 1, wherein the energy is further generated by the second set of beams in the second coverage region.

3. The method of claim 2, wherein the first set of beams are associated with a set of basis vectors of a beamspace associated with the first coverage region and the second coverage region.

4. The method of claim 1, wherein the first set of beams are associated with a set of basis vectors of a beamspace that includes a null space of a subspace associated with a set of codebook beams, the set of codebook beams associated with the second communications in the second coverage region.

5. The method of claim 1, wherein selecting the first set of beams comprises:
    selecting a first beam based at least in part on the set of gain parameters;
    updating a pool of beams to exclude the selected first beam; and
    performing a selection procedure to select additional beams based at least in part on the selected first beam, wherein the selection procedure includes one or more iterations.

6. The method of claim 5, wherein each iteration of the one or more iterations of the selection procedure comprises:
    selecting an additional beam based at least in part on the selected first beam, a prior iteration of the selection procedure, or both; and
    updating the updated pool of beams to exclude the selected additional beam.

7. The method of claim 1, further comprising:
    determining a separation parameter associated with the selected first set of beams,
    wherein the first selected set of beams are selected based at least in part on the determined separation parameter.

8. The method of claim 1, further comprising:
    determining the set of gain parameters based at least in part on performing a set of gain calculations using a normalized electric field for each antenna of the set of antennas.

9. The method of claim 1, wherein the first set of beams are selected based at least in part on a set of codebook beams associated with the second communications in the second coverage region.

10. The method of claim 1, wherein:
    the first coverage region includes an out-of-coverage region; and
    the second coverage region includes an in-coverage region.

11. An apparatus for wireless communications at a user equipment (UE), comprising:
    a processor;
    memory coupled with the processor; and
    instructions stored in the memory and executable by the processor to cause the apparatus to:
        select a first set of beams for first communications in a first coverage region and a second set of beams for second communications in a second coverage region, wherein selection of the first set of beams is based at least in part on a set of gain parameters associated with a set of antennas and with the second communications, wherein the first coverage region is different from the second coverage region;
        identify an energy generated by the first set of beams in the first coverage region, wherein the energy is generated for the first coverage region in accordance with the set of gain parameters associated with the second coverage region; and communicate with a device via the first set of beams based at least in part on the generated energy.

12. The apparatus of claim 11, wherein the energy is further generated by the second set of beams in the second coverage region.

13. The apparatus of claim 12, wherein the first set of beams are associated with a set of basis vectors of a beamspace associated with the first coverage region and the second coverage region.

14. The apparatus of claim 11, wherein the first set of beams are associated with a set of basis vectors of a beamspace that includes a null space of a subspace associated with a set of codebook beams, the set of codebook beams associated with the second communications in the second coverage region.

15. The apparatus of claim 11, wherein the instructions are further executable by the processor to cause the apparatus to:
select a first beam based at least in part on the set of gain parameters;
update a pool of beams to exclude the selected first beam; and
perform a selection procedure to select additional beams based at least in part on the selected first beam, wherein the selection procedure includes one or more iterations.

16. The apparatus of claim 15, wherein the instructions are further executable by the processor to cause the apparatus to:
select an additional beam based at least in part on the selected first beam, a prior iteration of the selection procedure, or both; and
update the updated pool of beams to exclude the selected additional beam.

17. The apparatus of claim 11, wherein the instructions are further executable by the processor to cause the apparatus to:
determine a separation parameter associated with the first selected set of beams,
wherein the selected first set of beams are selected based at least in part on the determined separation parameter.

18. The apparatus of claim 11, wherein the instructions are further executable by the processor to cause the apparatus to:
determine the set of gain parameters based at least in part on performing a set of gain calculations using a normalized electric field for each antenna of the set of antennas.

19. The apparatus of claim 11, wherein the first set of beams are selected based at least in part on a set of codebook beams associated with the second communications in the second coverage region.

20. The apparatus of claim 11, wherein:
the first coverage region includes an out-of-coverage region; and
the second coverage region includes an in-coverage region.

21. An apparatus for wireless communications at a user equipment (UE), comprising:
means for selecting a first set of beams for first communications in a first coverage region and a second set of beams for second communications in a second coverage region, wherein selection of the first set of beams is based at least in part on a set of gain parameters associated with a set of antennas and with the second communications, wherein the first coverage region is different from the second coverage region;
means for identifying an energy generated by the first set of beams in the first coverage region, wherein the energy is generated for the first coverage region in accordance with the set of gain parameters associated with the second coverage region; and
means for communicating with a device via the first set of beams based at least in part on the generated energy.

22. The apparatus of claim 21, wherein the energy is further generated by the second set of beams in the second coverage region.

23. The apparatus of claim 22, wherein the first set of beams are associated with a set of basis vectors of a beamspace associated with the first coverage region and the second coverage region.

24. The apparatus of claim 21, wherein the first set of beams are associated with a set of basis vectors of a beamspace that includes a null space of a subspace associated with a set of codebook beams, the set of codebook beams associated with the second communications in the second coverage region.

25. The apparatus of claim 21, wherein the means for selecting the first set of beams comprises:
means for selecting a first beam based at least in part on the set of gain parameters;
means for updating a pool of beams to exclude the selected first beam; and
means for performing a selection procedure to select additional beams based at least in part on the selected first beam, wherein the selection procedure includes one or more iterations.

26. The apparatus of claim 25, wherein the means for each iteration of the one or more iterations of the selection procedure comprises:
means for selecting an additional beam based at least in part on the selected first beam, a prior iteration of the selection procedure, or both; and
means for updating the updated pool of beams to exclude the selected additional beam.

27. The apparatus of claim 21, further comprising:
means for determining a separation parameter associated with the selected first set of beams, wherein the selected first set of beams are selected based at least in part on the determined separation parameter.

28. The apparatus of claim 21, further comprising:
means for determining the set of gain parameters based at least in part on performing a set of gain calculations using a normalized electric field for each antenna of the set of antennas.

29. The apparatus of claim 21, wherein the first set of beams are selected based at least in part on a set of codebook beams associated with the second communications in the second coverage region.

30. A non-transitory computer-readable medium storing code for wireless communications at a user equipment (UE), the code comprising instructions executable by a processor to:
select a first set of beams for first communications in a first coverage region and a second set of beams for second communications in a second coverage region, wherein selection of the first set of beams is based at least in part on a set of gain parameters associated with a set of antennas and with the second communications, wherein the first coverage region is different from the second coverage region;
identify an energy generated by the first set of beams in the first coverage region, wherein the energy is generated for the first coverage region in accordance with the set of gain parameters associated with the second coverage region; and communicate with a device via the first set of beams based at least in part on the generated energy.

\* \* \* \* \*